United States Patent [19]
Victora et al.

[11] Patent Number: 5,617,405
[45] Date of Patent: Apr. 1, 1997

[54] OPTICAL RECORDING MEDIUM HAVING AT LEAST TWO SEPARATE RECORDING LAYERS OF DIFFERENT WRITING TEMPERATURES

[75] Inventors: Randall H. Victora, Rochester; Giuseppe Farruggia, Webster, both of N.Y.

[73] Assignee: Eastman Kodak Company, Rochester, N.Y.

[21] Appl. No.: 611,266

[22] Filed: Mar. 5, 1996

[51] Int. Cl.$^6$ ............................................. G11B 3/74
[52] U.S. Cl. .................... 369/275.1; 369/94; 369/286
[58] Field of Search .................... 369/275.2, 275.1, 369/275.3, 275.4, 275.5, 14, 272, 273, 280, 281, 286, 94

[56] References Cited

U.S. PATENT DOCUMENTS

| | | | |
|---|---|---|---|
| 5,373,499 | 12/1994 | Imaino et al. | 369/275.1 |
| 5,381,401 | 1/1995 | Best et al. | 369/275.1 |
| 5,420,834 | 5/1995 | Finkelstein et al. | 369/275.2 |
| 5,446,723 | 8/1995 | Best et al. | 369/275.1 |
| 5,485,452 | 1/1996 | Maeda | 369/275.1 |
| 5,499,231 | 3/1996 | Fennema et al. | 369/275.1 |
| 5,513,170 | 4/1996 | Best et al. | 369/275.1 |

OTHER PUBLICATIONS

SPIE vol. 2338, p. 247, 1994 (K.A. Rubin, H.J. Rosen, W.W. Wang, W. Imaino, and T.C. Strand).

*Primary Examiner*—Tan Dinh
*Attorney, Agent, or Firm*—Raymond L. Owens

[57] ABSTRACT

An optical storage device comprising at least two spaced apart recording layers, a spacer layer separating by being positioned between alternating recording layers, and each recording layer including a material responsive to a beam of radiation from a source to record information and at least one recording layer having a different write temperature selected to improve recording performance parameters.

7 Claims, 1 Drawing Sheet

OPTICAL RECORDING MEDIUM HAVING AT LEAST TWO SEPARATE RECORDING LAYERS OF DIFFERENT WRITING TEMPERATURES

FIELD OF THE INVENTION

The present invention relates to optical storage devices which have multiple recording layers.

BACKGROUND OF THE INVENTION

Optical storage devices such as optical disks and optical tape are becoming more and more extensively used. It is, of course, highly desirable to increase the storage capacity and other performance parameters such as signal to noise and storage density.

A multilayer optical storage device is set forth in SPIE Vol. 2338, p. 247, 1994 (K. A. Rubin, H. J. Rosen, W. W. Wang, W. Imaino, and T. C. Strand). The recording layers consist of two or more recording surfaces spaced sufficiently far apart that each surface can be recorded and read independently. A two layer medium might be expected to offer twice the density of a conventional single layer medium. Generally, this is not true because the return light beam is severely attenuated relative to the return light beam found in a conventional single layer medium. For example, an attempt to read a layer that is not the layer closest to the radiation source requires the light to pass through the other layers with a consequent loss of intensity. Even reading the layer closest to the radiation source does not generate the maximum possible return beam because this layer must be optimized for transparency, not merely optimal return beam. It might, for example, be very thin and unreflective compared to a conventional single layer.

This severe attenuation of the return light beam substantially reduces the carrier. More significantly, the carder to noise ratio (CNR) also decreases because, unlike the carrier, the noise power usually consists of large contributions from sources not directly proportional to the beam intensity and thus not proportionately reduced by the attenuation. This reduction in CNR reduces the storage density of the layer and the overall storage device.

SUMMARY OF THE INVENTION

It is an object of the present invention to provide a multiple recording layer storage device which has improved performance parameters.

The object is achieved in an optical storage device, comprising:

a) at least two spaced apart recording layers;

b) a spacer layer separating by being positioned between alternating recording layers; and c) each recording layer including a material responsive to a beam of radiation from a source to record information and at least one layer having a different write temperature selected to improve recording performance parameters.

Advantages

An important advantage of the invention is increasing the carder, at the same available power of radiation source, relative to a device employing only a single write temperature. This is a consequence of the enhanced read power that can be used in reading the layers that have increased write temperature. If, for example, the write temperature of layer i is adjusted so that the optimum recording power (ORP) of layer i matches that of the layer most distant from the radiation source, then the increase in the available carrier can be estimated to equal the ORP of the layer most distant from the radiation source divided by the ORP of layer i in the absence of the invention, assuming that the ratio of the read power to the ORP is approximately the same for all layers, as is frequently the case. Noise can be typically expected to arise from a variety of sources; in most cases, the noise will increase with incident light power much less rapidly than the carder. Therefore, this invention is also expected to increase the Carder to Noise Ratio (CNR). This will further allow marks to be placed closer together than would otherwise be the case. Therefore, the invention is expected to increase the storage density of the device.

DETAILED DESCRIPTION OF THE INVENTION

Figure 1:
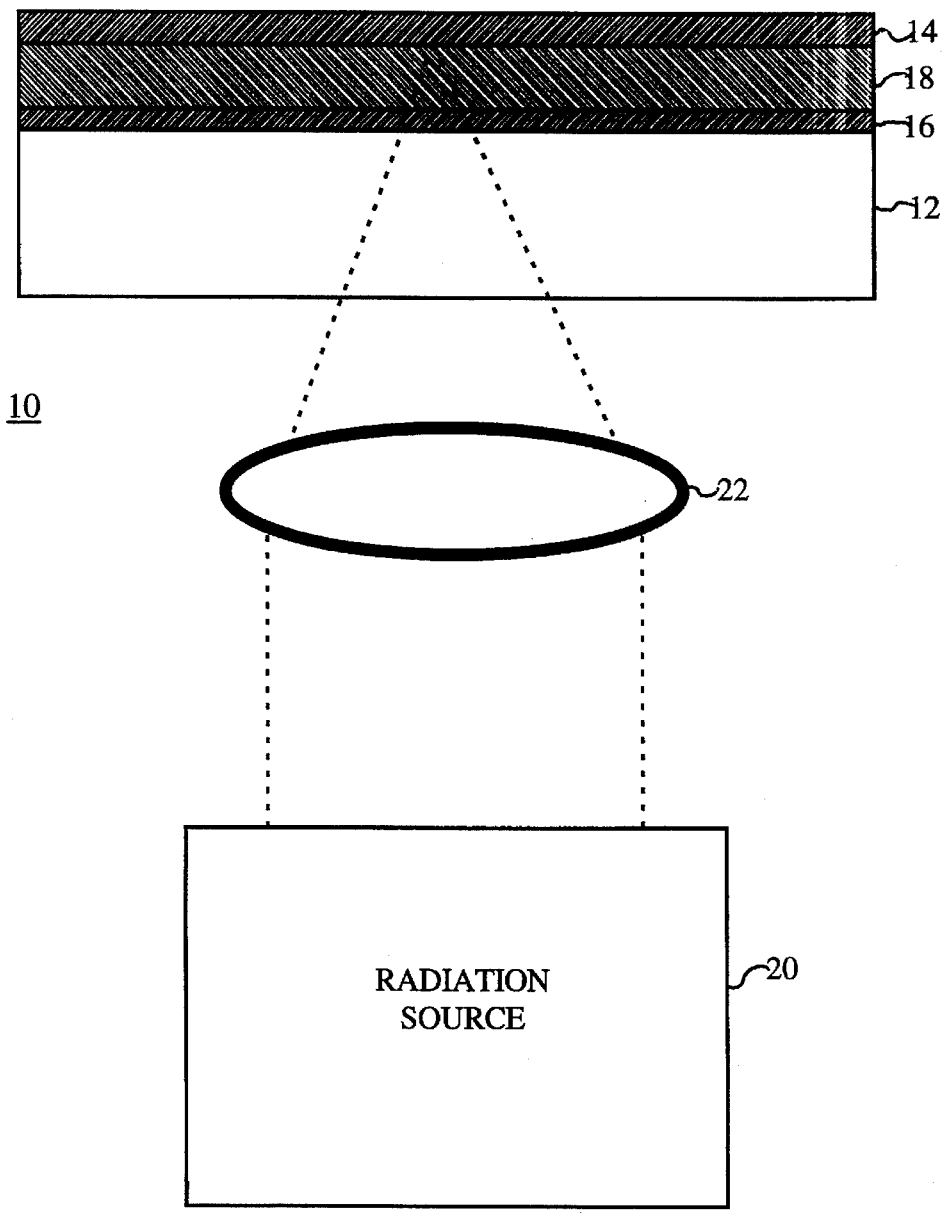
FIG. 1 is a diagramatic view of an optical storage device having two spaced apart optical recording layers.

Turning first to FIG. 1, there is shown an optical storage device 10. The device 10 includes a substrate 12 which typically can be made from polycarbonate or glass. There are two spaced apart recording layers 14 and 16. These recording layers will be discussed in more detail hereinafter. A spacer layer 18 is provided between the two recording layers. The spacer layer typically can be made from a transparent organic material (which does not interact with the wavelength of the radiation source) or air. A source of radiation 20 provides a beam of radiation which is focused by a focusing arrangement shown as a single lens 22. In the example shown, the radiation beam is focused on the surface of the recording layer 14. Of course, when recording is to take place on the layer 16, the beam will be focused on that layer. It will be understood that although two recording layers are shown, the present invention can include three or more recording layers with alternate recording layers being spaced apart by a spacer layer. Moreover, the recording process can take place through the non-substrate surface of the storage device and, in such a situation, the substrate could be opaque. Furthermore, the recording layers can be accompanied by other nonwritable layers such as dielectrics for optical enhancement or metals for reflecting fight.

In accordance with the present invention, an optical storage device includes multiple recording surfaces such that individual surfaces have differing write temperatures. The recording surfaces can contain rewritable materials such as magneto-optically active materials for which the write temperature is the temperature at which the magnetization can be reversed or erasable phase change materials for which the write temperature might be the temperature needed to form the higher temperature phase. The recording surfaces can also contain write-once materials such as write-once phase change where the write temperature might be the temperature of crystallization or ablative materials where the write temperature is the temperature necessary for ablative recording. It is recognized that the write temperature can depend on the speed of the recording process and, in consequence, the media velocity relative to the record beam.

In accordance with one aspect of the invention, the write temperature of the recording layer nearest the radiation source should be the highest with a monotonic decrease in write temperature with distance from the radiation source.

Advantageously, for more optimum results, the write temperatures can be selected such that the Optimum Recording Power (ORP), as measured by the light emitted from the radiation source, is identical for all layers. (Depending on the application, the ORP might be the power where the second harmonic of the signal is minimized relative to the first harmonic or the power where offset from the desired mark size is zero.) In another aspect of the invention the write temperatures are selected so that the ORP of layer i measured without the presence of the other layers is equal to the ORP of the layer most distant from the radiation source (as measured without the presence of the other layers) divided by the product of all the transmission coefficients for the layers inclusively between the layer second most distant from the source and layer i. This can be expressed by the following equation:

$$(ORP)_i = ORP_n / (T_{n-1} \ldots T_i)$$

wherein:

i is a number from 1 to n;

i=1 corresponds to the layer nearest to the light source;

n is the number of recording layers;

$ORP_i$ is the optimum recording power of layer i measured without the presence of the other layers; and $T_i$ is a transmission coefficient for layer i.

Alternatively, the difference between the write temperature of layer i and the ambient temperature can be selected to equal the difference between the write temperature of the layer most distant from the radiation source and the ambient temperature both divided by the product of all the transmission coefficients for the layers inclusively between the layer second most distant from the radiation source and layer i. This condition is equivalent to the previous two criteria if the ORP of layer i divided by the difference between the write temperature and the ambient temperature is equal for all layers. This can be expressed by the following equation:

$$(\theta_i - \theta_A) = (\theta_n - \theta_A) / (T_{n-1} \ldots T_i)$$

wherein:

$\theta_i$ is the write temperature of layer i;

$\theta_A$ is the ambient temperature; and $T_i$ is a transmission coefficient for layer i.

Although the implementation of multiple write temperatures alone will increase the performance of the storage device, further benefits can be be gained by a concomitant change in the optical properties of the individual layers. In particular, an optimal configuration would require that layers near the radiation source permit more transmission (accepting the consequent loss in signal) than would be found in a device optimized for a single write temperature on all layers.

Six examples of the implementation of the invention are now set forth. A 780 nm radiation source was used for generating both the measured and predicted data. For the purpose of calculating the extent to which the invention improves the carrier, in the first five examples it will be assumed that the record power (as measured for each layer in the absence of the other layers) and the optimum read power (as measured for each layer in the absence of the other layers) are proportional to the difference between the write temperature and ambient temperature. Deviations from this rule may be caused by layers having, for example, differing thermal transport characteristics and may increase or decrease the precise value of carrier enhancement offered by the invention. These deviations do not affect the general principle of the invention.

Example A: Consider a two-layer disk, employing dye as the active layer, arranged in a structure such that the transmission and reflection coefficients of the layer nearest the radiation source (layer 1) are 68% and 18%, respectively and the second layer (layer 2) has transmission and reflection coefficients of 20% and 30%, respectively. If the differences between the write temperature and the ambient temperature are chosen to follow a ratio of 1.47=1.0/0.68 and 1.0 for layers 1 and 2 respectively, then the carrier of layer 1 will increase by 3.3 dB=20 log 1.47 with no increase in maximum power demanded from the laser. The carrier of layer 2 will not change.

Example B: Consider a two layer disk where the thickness of layer 1 has been adjusted to distribute the enhancement provided by the invention over both layers. The transmission and reflection coefficients for the thinned layer 1 become 74% and 14%, respectively. This increases the carder of layer 1 by 1.2 dB and layer 2 by 1.5 dB provided that the carrier is proportional to the reflectivity. For magneto-optic materials the increase from layer 1 would be different.

Example C: Consider a four-layer disk for which the transmission coefficients for layers 1–4 are 84%, 79%, 68%, and 0%. The reflection coefficients for layers 1–4 are 8%, 11%, 18%, and 40%. The differences between the write temperature and the ambient temperature are chosen to follow a ratio of 2.22=1.0/(0.84*0.79*0.68), 1.86=1.0/(0.79*0.68), 1.47=1.0/0.68, and 1.0 for layers 1–4, respectively. If the write temperatures are required to be the same on all layers, then the carrier drops by 6.9 dB, 5.4 dB, and 3.3 dB on layers 1-3, respectively.

Example D: Consider a two-layer disk employing Co/Pt in the magneto-optic recording layers, the layers being separated by a spacer layer with refractive index of 1.3. The transmission coefficients are 56% and 12% for layers 1 and 2, respectively. The reflection coefficients are 6% and 44% for layers 1 and 2, respectively. The maximum Kerr rotations are 1.76 and 0.69 for layers 1 and 2, respectively. (Film thicknesses are 42Å and 200Å) If the differences between the write temperature and ambient temperature are chosen to follow a ratio of. 1.79=1.0/0.56 and 1.0 for layers 1 and 2 respectively, then the carrier of layer 1 o will increase by 5.1 dB=20 log. 1.79 with no increase in maximum power demanded from the laser. The carrier of layer 2 will not change.

Example E: Consider a four-layer disk employing Co/Pt in the magneto-optic recording layers, the layers being separated by a spacer layer, with refractive index of 1.3. The transmission coefficients are 75%, 71%, 56%, and 12% for layers 1–4, respectively. The reflection coefficients are 1%, 3%, 8%, and 44% for layers 1–4, respectively. The maximum Kerr rotations are 2.52, 1.57, 1.39, and 0.69 for layers 1–4, respectively. (Film thicknesses are 21Å, 23Å, 42Å, and 200Å.) The differences between the write temperature and ambient temperature are chosen to follow a ratio of 3.35= 1.0/(0.75*0.71*0.56), 2.52=1.0/(0.71*0.56), 1.79=1.0/0.56, and 1.0 for layers 1–4, respectively. If the write temperatures are required to be the same on all layers, then the carrier drops by 10.5 dB, 8.0 dB, and 5.1 dB on layers 1–3, respectively.

Example F: Co/Pt superlattice is a magneto-optically active layer particularly suitable for implementation of this invention. A two-layer disk was made using a recording material consisting of 0.22 nm Co layers sandwiched by 0.7 nm Pt layers. The semitransparent layer 1 of this disk is 4.2 nm thick and layer 2 is 20 nm thick. Recording experiments show that the threshold of layer 1 is approximately 2.4 mW with an optimum record power of approximately 5.5 mW.

The threshold of layer 2 was approximately 3.3 mW with an optimum record power of approximately 7.0 mW. Layer 1 produced a carder of −2.8 dB, a 30 kHz slot noise of −44.5 dB, and CNR of 41.7 dB when measured using a 0.5 NA lens, a velocity of 3 M/s, a recording frequency of 1.57 Mhz, a bandwidth of 30 kHz, and a read power limited to 1.5 mW to reduce erasure during read. Following the teaching of the invention a second disk is fabricated using the same composition for layer 2, but using a recording material consisting of 0.35 nm Co layers sandwiched by 0.7 nm Pt layers for layer 1. This increases the threshold of layer 1 to approximately 3.3 mW and the optimum recording power to approximately 7 mW. The carrier was now increased to 0.5 dB, the slot noise is approximately the same at −44.6 dB, and the CNR is increased to 45.1 dB, all under the same conditions as used for the unimproved layer 1 except that the read power was increased to 2.0 mW because the threshold for recording is higher. Accidental improvements to layer 1 owing to extraneous effects such as improved coercivity or Kerr rotation with higher Co content were demonstrated to provide only 0.3 dB of this improvement in CNR by remeasuring the improved layer 1 at the reduced read power (1.5 mW) suitable for the original layer 1. Therefore, implementation of the invention has generated an additional 3 dB of CNR with no requirement of higher maximum laser power.

A feature of the invention is that it increases performance in the presence of optically enhancing layers needed to generate adequate carrier for some recording materials.

An alternative method is to vary the thermal properties of the material surrounding the recording layer. For example, the recording layer nearest the light source can be surrounded by thermally conducting materials that will have the effect of decreasing the sensitivity of the layer to the radiation power and the farther recording layers can be surrounded by thermally insulating materials that will have the effect of increasing the sensitivity.

The invention has been described in detail with particular reference to certain preferred embodiments thereof, but it will be understood that variations and modifications can be effected within the spirit and scope of the invention.

PARTS LIST 10 optical storage device
12 substrate
14 recording layer
16 recording layer
18 spacer layer
20 radiation source
22 single lens

We claim:

1. An optical storage device, comprising:

a) at least two spaced apart recording layers;

b) a spacer layer separating by being positioned between alternating recording layers; and c) each recording layer including a material responsive to a beam of radiation from a source to record information and at least one layer having a write temperature different than other recording layers and selected to improve recording performance parameters.

2. The optical storage device of claim 1 wherein the write temperature of the recording layer nearest the radiation source is higher than the write temperature of the recording layer furthest from the radiation source with a monotonic decrease in write temperature as the distance from the radiation source increases.

3. The optical recording device of claim 1 wherein the write temperatures of each recording layer is selected such that the optimum recording power as measured by the radiation emitted from the source is substantially identical for all recording layers.

4. The optical recording device of claim 1 wherein the write temperature of each recording layer is selected so that the following equation is satisfied:

$$(ORP)_i = ORP_n/(T_{n-1} \ldots T_i)$$

wherein:

i is a number from 1 to n;

i=1 corresponds to the layer nearest to the light source;

n is the number of recording layers;

$ORP_i$ is the optimum recording power of layer i measured without the presence of other layers (spacer and recording); and $T_i$ is a transmission coefficient for layer i.

5. The optical recording device of claim 1 wherein the write temperature for each layer is selected from the following equation:

$$(\theta_i - \theta_A) = (\theta_n - \theta_A)/(T_{n-1} \ldots T_i)$$

wherein:

$\theta_i$ is the write transmission temperature of layer i;

$\theta_A$ is the ambient temperature;

i is a number from 1 to n;

n is the number of recording layers;

i=1 corresponds to the layer nearest to the light source; and $T_i$ is a transmission coefficient for layer i.

6. The optical recording device of claim 1 wherein the recording layers nearest the radiation source permit more transmission than those furthest from the source.

7. The optical recording device of claim 1 wherein the recording layer materials are selected from the group consisting of:

a) magneto-optic;

b) erasable and non-erasable phase change; and c) ablative.

* * * * *